Nov. 21, 1950     E. H. DESMOULINS     2,531,032
PROPELLING MECHANISM
Filed Dec. 17, 1938
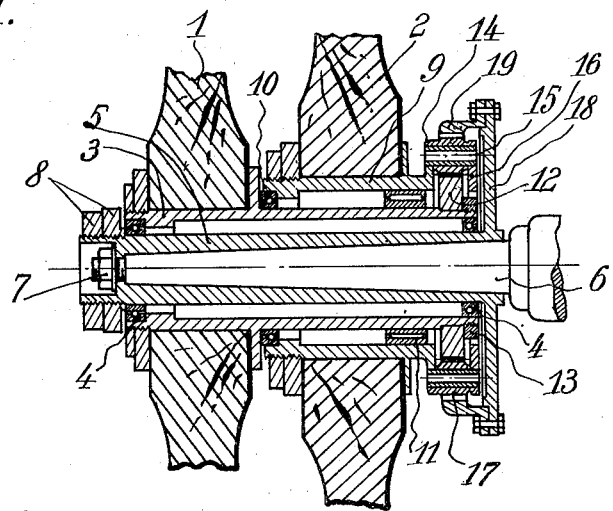
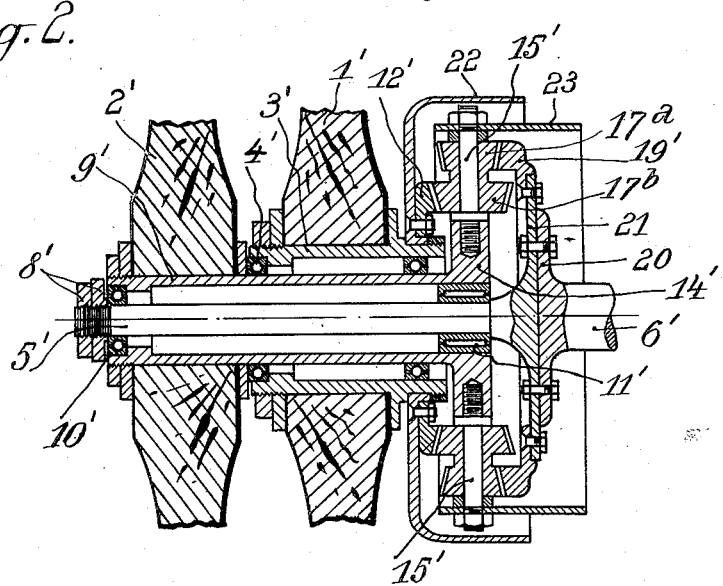
Inventor:
Emile Hyacinthe Desmoulins
By
Glascock, Downing & Seebold
Attorneys

UNITED STATES PATENT OFFICE 2,531,032

PROPELLING MECHANISM

Emile Hyacinthe Desmoulins, Puteaux, France

Application December 17, 1938, Serial No. 246,252
In France December 30, 1937

Section 3, Public Law 690, August 8, 1946
Patent expires December 30, 1957

1 Claim. (Cl. 74—801)

The present invention relates to a propelling mechanism for the propulsion of motor driven machines.

The propeller unit of a motor driven machine, especially of an airplane or hydroplane, usually consists of a propeller rotatively driven by an engine, between which a speed reducing device may be interposed.

Propeller devices have been constructed which comprise two propellers carried by two different shafts rotatively driven by a single engine by means of suitable transmissions.

Propeller devices have also been constructed having two propellers carried by two coaxial shafts, one of said shafts extending through the other shaft, which latter is tubular, these two propellers rotating in opposite directions, each being rotatively driven by an engine owing to a suitable transmission.

An object of the present invention is to provide a propeller unit for motor driven machines of a simple construction and one which will allow a better utilization of the power of the motor of such driven machines.

Other objects will be in part obvious and in part pointed out hereinafter as the description continues.

In the drawings:

Fig. 1 is a vertical longitudinal sectional view of a propeller unit for motor driven machines embodying the invention, and Fig. 2 is a similar view showing a slightly modified form.

The propeller unit as shown in Fig. 1 is adapted for use preferably upon airplanes and comprises two propellers 1 and 2 having reverse pitches coaxially arranged with respect to one another and capable of being rotatively driven in opposite directions by one and the same engine.

The propeller 1 is mounted upon and secured to one end of a tubular shaft 3. This shaft 3 is journalled upon the two spaced ball bearings 4 carried by a second tubular shaft 5. The motor arranged within the aircraft or other driven machine is provided with a spindle 6 extending from one end of the driven shaft thereof and the tubular shaft 5 is received by and secured to this spindle 6, so as to rotate therewith. A nut 7 is connected to the outer end of the spindle 6 for detachably connecting the shaft 5 thereto. Detachable rings or nuts 8 are connected to the outer end of the shaft 5 for engagement with the outermost ball bearing 4 which latter in turn limits the longitudinal movement in one direction of the tubular shaft 3 upon the shaft 5.

The propeller 2 is mounted upon and secured to a sleeve shaft 9 which latter is journalled upon a ball bearing 10 and a needle bearing 11 carried by the tubular shaft 3, the ball bearing 10 forming a longitudinal abutment for this sleeve shaft 9. From this arrangement it is apparent that the tubular shafts and tubular sleeve 9 are all arranged concentrically to one another and upon the rotation of the spindle 6 the shaft 5 will be carried therewith without rotating the tubular shaft 3 or tubular sleeve 9 except for the planetary gearing hereinafter described.

Keyed to the inner end of the tubular shaft 3 is a driven sun gear 12 and the latter is retained in place by a ring or plate 13 having threaded engagement with the inner end of the shaft 3. The inner end of the tubular sleeve 9 has formed therewith a flange or plate 14 which extends parallel with and in spaced relation to the plate 13. Journalled in the plates 13 and 14 are spindles 15 each carrying a pinion 17 forming a chain of intermediate gearing which are in mesh with the driven gear 12.

Formed with the inner end of the tubular shaft 5 is a flange or plate 18 and secured by suitable fastening elements to one face of this plate 18 adjacent the outer periphery thereof is an internally toothed drive gear 19 which also meshes with the intermediate pinions 17. From this arrangement it is also apparent that as the engine rotates the spindle 6 in one direction the internal gear 19 will rotate therewith and the sleeve shaft 9 together with the propeller 2 will also rotate in the same direction therewith. Due to the intermediate pinions 17 the gear 12 will be caused to rotate in an opposite direction from that of the gear 19 and the tubular shaft 3 together with the propeller 1 carried thereby will rotate in the same direction as that of the gear 12 or in a direction opposite to that of the propeller 2.

In the modified form of the invention as shown in Fig. 2 the propellers 1' and 2' may still rotate in opposite directions upon a common drive shaft and yet be subjected to variations of speed, that is, the speed of rotation of one propeller may equal that of the drive shaft and the speed of rotation of the other propeller may be reduced or vice-versa. These propellers 1' and 2' may have reverse pitches or may be of different diameters as conditions or use thereof may warrant.

The engine or drive shaft 6' is provided with a flange 20 secured by means of the bolts as shown to a flange 21 formed with the inner end of the spindle 5'. Connected to the flange 21 is a driving bevelled crown gear 19' which meshes with the bevel pinions 17a and the pinions 17a have each formed integrally therewith another bevel pinion 17b. These planetary pinions 17a and 17b are journalled upon the spindles 15' carried by the flange 14' formed with the inner end of the tubular shaft 9' and secured to the outer end of this shaft 9' is the forward propeller 2'. Interposed between the spindle 5' and shaft 9' is the ball bearings 10' and 11' and the lock-nuts 8' are provided for retaining the shaft 9' upon the spindle 5'. The tubular sleeve 3' is rotatably mounted upon the shaft 9' by means of the ball bearings 4' and has secured thereto the propeller 1'. A brake drum 22 is connected to the inner end of the sleeve 3' and has secured thereto a driven bevel sun gear 12' which later meshes with the pinions 17b. Connected to the spindles 15 for the planetary gears is another brake drum 23 and by applying suitable braking power to either or both of these drums 23 and 23 the speed of rotation of the propellers may be varied at will.

I claim:

A drive for rotating a pair of coaxial members in opposite directions comprising a spindle to be driven from a power source, a tubular shaft for supporting one of said coaxial members on the outer end thereof and journalled upon and arranged concentrically with said spindle, a flange extending substantially at right angles from and rotatable by the inner end of said spindle, an annular driving gear carried at the outer extremity of said flange and having internal teeth positioned substantially parallel to said tubular shaft, a tubular sleeve for supporting the second of said coaxial members on the outer end thereof and journalled upon and arranged concentrically with said tubular shaft, a flange extending from the inner end of said sleeve, pinions journalled upon said flange positioned adjacent said spindle flange and in mesh with said driving gear, a sun gear secured to the inner end of said tubular shaft, extending at about right angles thereto in line with said driving gear and in mesh with said pinions for rotating said tubular shaft in an opposite direction to said tubular sleeve.

EMILE HYACINTHE DESMOULINS.

REFERENCES CITED

The following references are of record in the file of this patent:

UNITED STATES PATENTS

| Number | Name | Date |
|---|---|---|
| 1,431,683 | Ramsay | Oct. 10, 1922 |
| 1,434,620 | McCain | Nov. 7, 1922 |
| 1,513,981 | Gilbert | Nov. 4, 1924 |
| 1,821,450 | Stelzer | Sept. 1, 1931 |
| 1,887,429 | Price | Nov. 8, 1932 |
| 1,902,374 | Pirinoli | Mar. 21, 1933 |
| 1,950,971 | Chilton | Mar. 13, 1934 |
| 2,085,483 | Trebucien | June 29, 1937 |
| 2,123,057 | Martin | July 5, 1938 |
| 2,148,313 | Williams | Feb. 21, 1939 |
| 2,154,532 | Ryder | Apr. 18, 1939 |
| 2,194,060 | Van Vactor | Mar. 19, 1940 |

FOREIGN PATENTS

| Number | Country | Date |
|---|---|---|
| 9,413A | Great Britain | Apr. 23, 1907 |
| 14,743 | Great Britain | June 19, 1914 |
| 280,257 | Germany | Nov. 10, 1914 |
| 356,090 | Italy | Jan. 25, 1938 |
| 357,807 | Italy | Mar. 28, 1938 |
| 421,889 | Great Britain | Dec. 24, 1934 |
| 499,985 | France | Dec. 4, 1919 |
| 722,339 | France | Dec. 29, 1931 |